(12) United States Patent
Talaski

(10) Patent No.: US 10,920,722 B2
(45) Date of Patent: Feb. 16, 2021

(54) WIRE WITH ELECTROSTATICALLY CONDUCTIVE INSULATOR

(71) Applicant: Walbro LLC, Tucson, AZ (US)

(72) Inventor: Edward J. Talaski, Caro, MI (US)

(73) Assignee: Walbro LLC, Tucson, AZ (US)

(*) Notice: Subject to any disclaimer, the term of this patent is extended or adjusted under 35 U.S.C. 154(b) by 10 days.

(21) Appl. No.: 16/280,327

(22) Filed: Feb. 20, 2019

(65) Prior Publication Data

US 2019/0285035 A1 Sep. 19, 2019

Related U.S. Application Data

(60) Provisional application No. 62/643,212, filed on Mar. 15, 2018.

(51) Int. Cl.

| | |
|---|---|
| *F02M 37/10* | (2006.01) |
| *H01B 3/00* | (2006.01) |
| *B60R 16/06* | (2006.01) |
| *B60K 15/03* | (2006.01) |
| *F02M 37/08* | (2006.01) |

(52) U.S. Cl.
CPC .......... *F02M 37/103* (2013.01); *B60R 16/06* (2013.01); *H01B 3/004* (2013.01); *B60K 2015/03217* (2013.01); *B60K 2015/03243* (2013.01); *B60K 2015/03401* (2013.01); *B60Y 2410/115* (2013.01); *F02M 2037/082* (2013.01)

(58) Field of Classification Search
CPC .......... B60K 15/03; B60K 2015/0321–03223; B60K 2015/03243; B60K 2015/03401; B60Y 2410/115; F02M 37/10; F02M 37/103; F02M 2037/082; B60R 16/06; H01B 3/004

See application file for complete search history.

(56) References Cited

U.S. PATENT DOCUMENTS

| | | | |
|---|---|---|---|
| 5,216,204 A | 6/1993 | Dudek et al. | |
| 9,064,618 B2 | 6/2015 | Kuchta et al. | |
| 2002/0124833 A1* | 9/2002 | Fauser | F02M 37/10 123/509 |
| 2004/0011129 A1* | 1/2004 | Gilmour | B60K 15/00 73/313 |
| 2013/0133765 A1* | 5/2013 | Israelson | F04D 5/002 137/565.13 |
| 2016/0017850 A1* | 1/2016 | Israelson | F02M 37/103 123/497 |

* cited by examiner

*Primary Examiner* — Hung Q Nguyen
*Assistant Examiner* — Mark L. Greene
(74) *Attorney, Agent, or Firm* — Reising Ethington P.C.

(57) ABSTRACT

In at least some implementations, a wire includes a core formed from an electrically conductive material and having an outer surface, and a polymeric insulator surrounding the core. The insulator has a resistivity of between $10^5$ and $10^9$ ohms/square, and the insulator has an inner surface engaged with the core. In at least some implementations, the core is formed from metal and has a conductivity of at least $1\times10-6$ Ωm. The insulator may include a base material and a conductive material in the base material, wherein the conductive material has a conductivity between $10^5$ and $10^6$ ohms/square. The insulator may have an outer surface that defines an outer surface of the wire and/or the insulator may have an inner surface engaged with the core.

12 Claims, 2 Drawing Sheets

WIRE WITH ELECTROSTATICALLY CONDUCTIVE INSULATOR

REFERENCE TO RELATED APPLICATIONS

This application claims the benefit of U.S. Provisional Application Ser. No. 62/643,212 filed on Mar. 15, 2018, the entire contents of which is incorporated herein by reference in its entirety.

TECHNICAL FIELD

The present disclosure relates generally to a wire that has a conductive core and an insulator surrounding the core that is electrostatically conductive.

BACKGROUND

Fuel pump assemblies are used to pump fuel from a fuel tank to an engine to support operation of the engine. Such fuel pump assemblies include a fuel pump and often other components, like fuel level sensors and sometimes fuel pressure regulators. The flow of fuel into and out of the fuel tank, as well as through the fuel pump assembly as caused by the fuel pump, can generate an electrostatic charge that may tend to build-up on one or more components of the module and/or the tank, and there is sometimes a need to electrically ground such components.

SUMMARY

In at least some implementations, a wire includes a core formed from an electrically conductive material and having an outer surface, and a polymeric insulator surrounding the core. The insulator has a resistivity of between $10^5$ and $10^9$ ohms/square, and the insulator has an inner surface engaged with the core.

In at least some implementations, the core is formed from metal and has a resistivity of at least $1 \times 10^{-6}$ Ωm (i.e. a conductivity of at least $1 \times 10^6$ siemens/meter). The insulator may include a base material and a conductive material in the base material, wherein the conductive material has a resistivity between $10^5$ and $10^6$ ohms/square. The insulator may have an outer surface that defines an outer surface of the wire and/or the insulator may have an inner surface engaged with the core. The core may have a diameter of between 0.2mm and 1.5mm and the insulator may have an outer diameter of between 0.5mm and 2.7mm. In at least some implementations, the maximum charge that may exist in the insulator when the insulator is coupled to ground is 0 volts to 200 volts.

In at least some implementations, a portion of a fuel system includes a first fuel system component that is coupled to ground, a second fuel system component and a wire having an insulator and a core. The insulator is electrically coupled to the second fuel system component and the core is coupled to the first fuel system component to permit static charges from the second fuel system component to flow to ground through the insulator.

In at least some implementations, electricity is provided to the first fuel system component via the core at a voltage of less than 50 volts, and the insulator is insulative to voltages less than 50 volts. The first fuel system component may include an electric motor, and/or the second fuel system component may be arranged to permit fuel flow therethrough. The second fuel system component may include a portion that is metal and the conductor may be in contact with the portion that is metal.

In at least some implementations, the insulator includes an inner surface engaged with the core and an outer surface that defines an outer surface of the wire and which is electrically coupled to the second fuel system component. The core may be formed from metal and has a resistivity of at least $1 \times 10^{-6}$ Ωm (i.e. a conductivity of at least $1 \times 10^6$ siemens/meter). The insulator may include a base material and a conductive material in the base material, and the conductive material may have a resistivity between $10^5$ and $10^6$ ohms/square. The insulator may have an outer surface that defines an outer surface of the wire. The core may have a diameter of between 0.2 mm and 1.5mm, and the insulator may have an outer diameter of between 0.5 mm and 2.7 mm. The insulator may have an inner surface engaged with the core. In at least some implementations, the maximum charge that may exist in the insulator when the insulator is coupled to ground is 0 volts to 200 volts.

It is contemplated that the various features set forth in the preceding paragraphs, in the claims and/or in the following description and drawings may be taken independently or in any combination. For example, features disclosed in connection with one embodiment or implementation are applicable to all embodiments or implementations, except where there is incompatibility of features.

BRIEF DESCRIPTION OF THE DRAWINGS

The following detailed description of certain embodiments and best mode will be set forth with reference to the accompanying drawings, in which.

DETAILED DESCRIPTION

Figure 1:
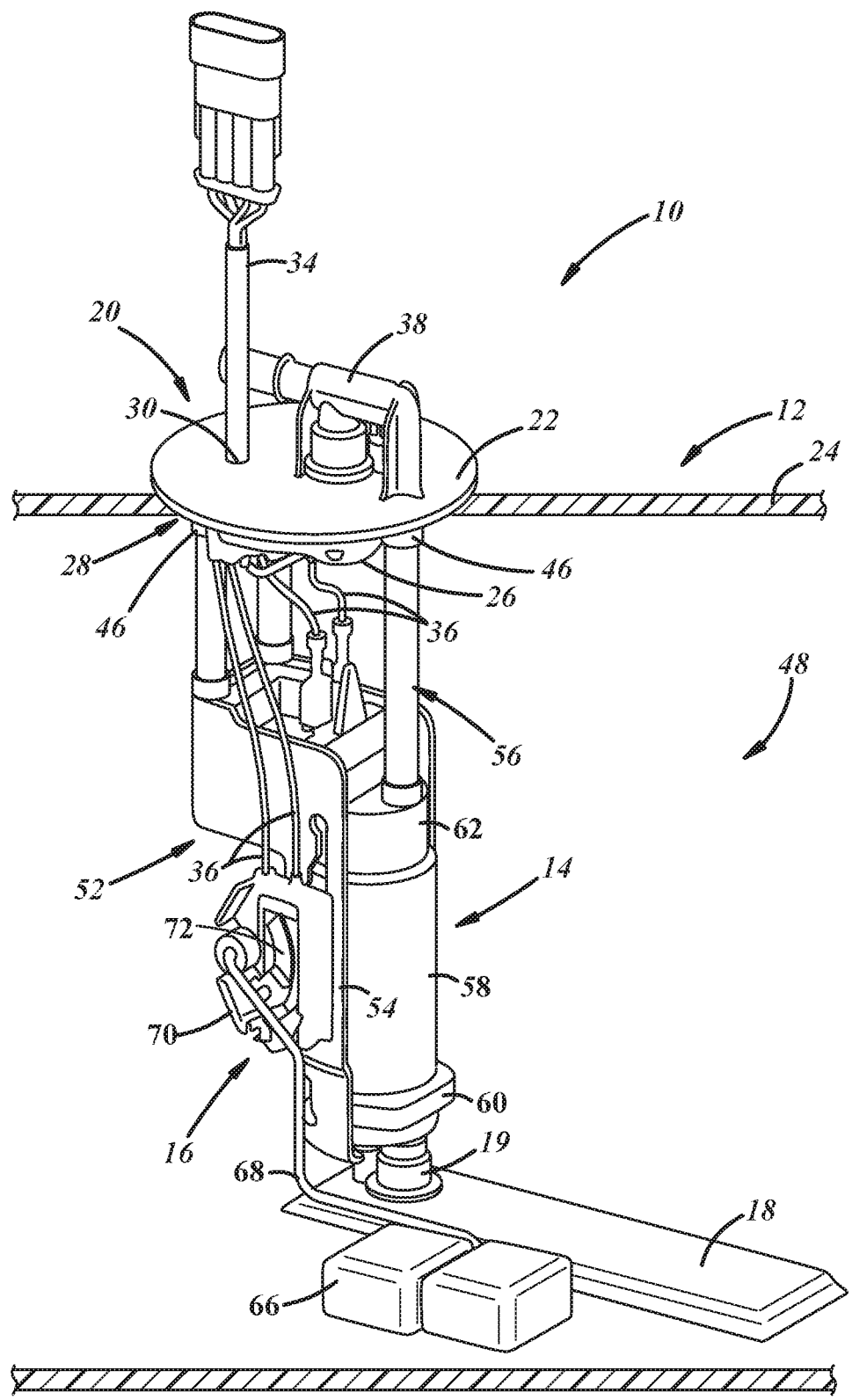
FIG. 1 is a perspective view of a fuel supply module including an electric motor fuel pump and a fuel level sensor each coupled to wires that pass through a mounting flange of the module.

Referring in more detail to the drawings, FIG. 1 illustrates a fuel pump assembly 10 that is constructed and arranged to be disposed within a vehicle fuel tank 12 (only part of which is shown), such as in a marine vehicle, snowmobile, ATV, motorcycle or automobile, which are non-limiting examples. The assembly 10 includes an electric motor driven fuel pump 14 that delivers fuel under pressure from the fuel tank 12 to an engine to support operation of the engine. The fuel pump 14 may include a turbine type pumping element (e.g. a rotary impeller) used to pressurize the fuel, or any other suitable type, including but not limited to a positive displacement pump with gerotor or other pumping elements. The assembly 10 may also include a fuel level sender 16 that provides an indication of the amount of fuel within the fuel tank 12, and a fuel filter 18 that may filter fuel before that fuel is drawn into the inlet 19 of the fuel pump 14.

Figure 3:
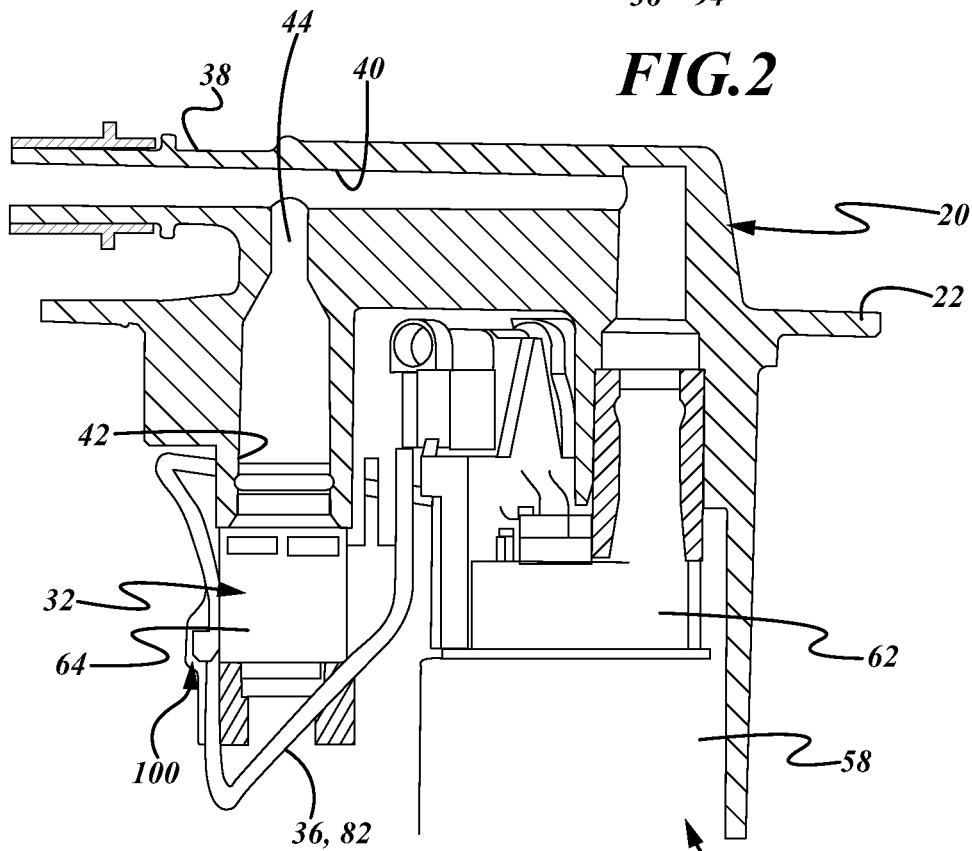
FIG. 3 is a fragmentary side view showing the wire insulator in contact with an electrically conductive surface, shown as a metal housing of a pressure regulator.

The fuel pump assembly 10 includes a mounting flange 20 having a radially outwardly extending lip 22 adapted to overlie and be sealed to a fuel tank wall 24, and may have a depending cylindrical skirt 26 adapted to be received within an opening 28 of the fuel tank. The mounting flange 20 may carry one or more components or accessories of the fuel pump assembly 10 (sometimes called a "module"), such as an electrical connector or electrical pass through region 30 (e.g. an area through which wires may pass through the flange, preferably with a seal between the wires and flange) and a fuel pressure regulator 32 (FIG. 3). The electrical connector or pass through region 30 may couple together wires 34 external to the fuel tank 12 with wires 36 within the fuel tank and connected to, for example, the fuel level sender 16 and the fuel pump 14. In this way, power may be provided to the components 14, 16 within the tank 12, and signals (e.g. a variable resistance in the fuel level circuit indicative of fuel level) from the components may be provided to a location outside of the tank. The fuel level sender 16, pressure regulator 32 and electrical connector or pass through region 30 may be of generally standard construction and will not be described further herein. A fluid fitting 38 with an internal passage 40 (FIG. 3) may be provided on or molded with the mounting flange 20 and may communicate the outlet of the fuel pump 14 with a fuel line through which fuel is delivered to the engine. To retain the pressure regulator 32 on the flange 20, the flange 20 may include a pocket or cavity 42 that receives part of the pressure regulator. The cavity 42 may be communicated with the fluid fitting passage 40 via a connecting passage 44 so that outlet fuel from the fuel pump 14 is communicated with the pressure regulator 32.

The mounting flange 20 may be molded of a polymeric material suitable for use with a polymeric fuel tank 12, and to be sealed to a fuel tank wall 24, or the flange may be formed from metal or any other suitable material. The mounting flange 20 may include one or more first coupling features 46 that may extend into or are otherwise open to an interior 48 of the fuel tank 12 (in which the fuel pump is received) and are constructed and arranged to facilitate coupling the fuel pump 14 to the flange. The first coupling features 46 may include one or more blind bores in cylindrical projections extending from the flange 20, or one or more projections extending from the flange into the fuel tank 12 (e.g. toward the fuel tank interior 48), or both.

The fuel pump 14 may be supported by a carrier 52. The carrier 52 may have any desired shape and size. In the implementation shown, the carrier 52 includes a sidewall 54 that surrounds at least part of the fuel pump 14 but does not completely enclose the fuel pump. In other implementations, the fuel pump may be received within a canister or reservoir that maintains a supply of fuel separate from the tank (e.g. by a check valve between the tank fuel and reservoir fuel volumes). The fuel pump 14 could be connected to the carrier sidewall 54 in any suitable way, including by a bracket, clip, band, fasteners or the like, so that the fuel pump is carried by and or retained in place relative to the carrier 52. To retain the position within the fuel tank 12 of the carrier 52 and fuel pump 14, the carrier and/or the fuel pump may be coupled to the mounting flange 20. In the example shown, supports 56 extend between the flange and one or both of the carrier 52 and fuel pump 14.

The flow of fuel into and out of the tank 12, as well as through the fuel pump assembly 10 as caused by the fuel pump 14, can generate an electrostatic charge that may tend to build-up on one or more components of the module and/or the tank. Certain components, or portions of the components, may be formed from metal and thus somewhat readily conduct static electric charges to inhibit or prevent a static electric charge from forming or building-up (e.g. increasing in magnitude) on such component(s). Other components, or portions of the components, may be formed from polymeric materials that do not readily conduct electricity so static electric charges may form and build-up on these components. For example. the fuel pump 14 may include a housing that has a cylindrical casing 58 formed from metal, an inlet end cap 60 formed from plastic and coupled to one end of the casing 58 and an outlet end cap 62 formed from plastic and coupled to the other end of the casing. Further, the carrier 52, supports 56, flange 20 and other module components may be formed from plastic. As shown in FIG. 3, the pressure regulator 32 may include a body or housing 64 at least a portion of which is formed from metal, or the regulator housing may be formed from plastic. The level sender 16 may include a plastic float 66 coupled to a metal arm 68 that is pivotably coupled to a plastic housing 70 in which a variable resistor circuit element 72 is retained. The plastic sensor housing 70 may be coupled to the carrier 52, to the fuel pump 14, or to both.

Thus, the assembly 10 may include a mix of metal and plastic components, and while the metal components may more readily conduct static electricity such that significant charges do not remain on those components, the metal components may be carried by or include plastic parts or portions that do not readily conduct electricity and on which static electric charges may form. It may be desirable to couple one or more components in the assembly to ground to prevent formation of and/or dissipate static electric charges that might otherwise form on such components. In at least some implementations, the fuel pump 14 may be coupled to two wires 36 or leads, a positive or hot lead and a negative lead. Likewise, positive and negative leads 36 may be coupled to the variable resistor circuit element 72 of the level sensor 16, and a voltage may be applied to the resistor circuit element to enable determination of the resistance when desired. At least some components may be conductively coupled to one of the wires so that any static electricity may be conducted away from such components via the wire(s).

Figure 4:
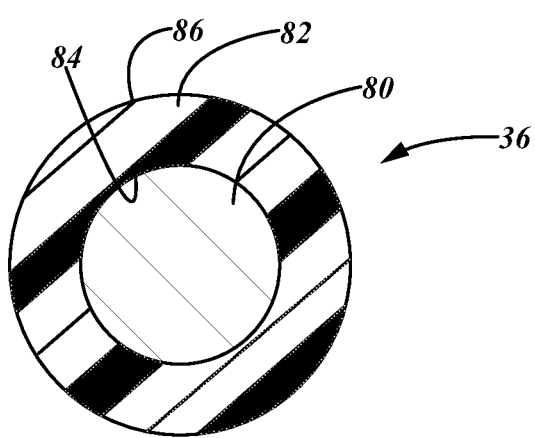
FIG. 4 is a cross-sectional view of a wire including a conductive core and an insulator surrounding the core.

In at least some implementations, the wires 36 each include a conductive core 80 and an insulator 82 that surrounds the core as is shown in FIG. 4. The core 80 may be formed from a solid or twisted wire, a cable, or any other conductor element. The insulator 82 may be a polymeric or composite material and has an inner surface 84 that engages the core 80 and an outer surface 86 that may be exposed to the environment. The insulator 82 may be formed from a single layer of material, formed at the same time, that is, it may be a continuous body between the inner and outer surfaces 84, 86 instead of a multi-piece or multi-layer body where the different layers are formed or provided on the wire at different times. The outer surface 86 of the insulator 82 may define the outer surface of the wire 36 (i.e. there are not other layers of material surrounding the insulator, and the insulator both engages the conductor and defines the outer surface of the wire). The insulator material may be homogeneous or may vary, for example, from the inner surface 84 toward the outer surface 86. In one example, the insulator may include a base material and electrically conductive particles in or on the base material, such as carbon black or metal particles. The conductive particles may be embedded or mixed in the material throughout the entirety of the insulator 82, or the insulator may have a greater concentration of conductive particles on or nearer the outer surface 86 than the inner surface 84. While described as particles, the conductive elements need not be discrete entities, can be defined by powder fillers, fibers or other elements.

In at least some implementations, the insulator 82 has a conductivity chosen to prevent shorting of the core 80 if the insulator is engaged with a metal or other electrically conductive component while being conductive to and permitting dissipation of static electric charges via the insulator. That is, the conductivity of the insulator 82 is low enough that only an insignificant magnitude of electrical energy flows from the core 80 through the insulator, but static electrical charges may be conducted by the insulator. In at least some implementations, the insulator 82 has a resistance less than 100K ohms/square, with surface resistivity between $10^5$ and $10^6$ ohms/square. In the example of a 2 mm diameter wire having a 1 mm diameter core, an insulator 82 with that resistivity may permit a maximum charge of about 2,000 volts. Thus, greater than 2,000-volt static electricity charges generally will not accumulate along the wire 36, or in a component to which the wire is coupled. In at least some implementations, the core 80 may be between 0.2 mm and 1.5 mm in diameter, and the insulator 82 may have an outer diameter between 0.5 mm and 2.7 mm, and the insulator may have a thickness (measured radially relative to an axis of the core) of between 0.2 mm and 1.3 mm. And the maximum charge that may exist in the insulator 82 when the insulator is coupled to ground is zero volts to 200 volts.

The voltage in the wire 36 is much lower, typically less than 50 volts and often lower than 14 volts, for example, when power through the wire is provided by a 12-volt battery. So the power conducted through the insulator 82 (when the insulator is electrically coupled/engaged with a grounded component or surface) from the core 80 is minimal and does not affect the power supply through the wire 36. When used with a positive wire (as opposed to the negative wire), the power dissipation from the core 80 at 12 volts with 15 amps current, is less than 1 milliamp. In this way, the insulator 82 may be deemed to be electrostatically conductive but not conductive (i.e. insulative) to the electricity provided via the core 80. In at least some implementations, the conductivity range or resistance range is between $10^5$ and $10^9$ ohms per square.

Representative materials for the base material of the insulator 82 include acetal, polycarbonate, Polyetherimide, polyamide-imide (PAI), Polyetheretherketone (PEEK), ETFE, Polyethylene and Nylon. Representative materials for the conductive material of the insulator 82 include Copper which may be plated, for example, with silver or tin, stainless steel and aluminum. In at least some implementations, the insulator 82 may be formed from or include materials sold by Ensinger Industries of Washington, Pennsylvania under the tradenames Tecaform®, Hydel®, Tecapeek and Sintimid®. Of course, other materials may be used, as desired.

Figure 2:
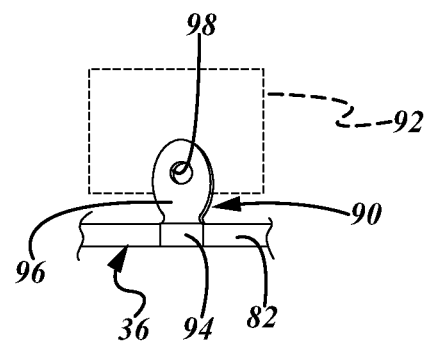
FIG. 2 is a perspective view of an end connector or terminal coupled to an insulator of the wire.

With the insulator 82 defining the outer surface of the wire 36 and being conductive to static electricity, the wire 36 may be engaged with a metal component or other component coupled to ground to prevent the build-up of a static electric charge beyond a threshold voltage level to reduce the likelihood of a significant (e.g. above the threshold voltage level) static electric discharge from the fuel assembly 10. As shown in FIG. 2, an electrically conductive terminal or other fitting 90 may be connected to the insulator 82 and also to another component 92 to couple the insulator to the component. The fitting may be formed from a material that is at least as conductive or is more conductive than the insulator 82. In the example shown, the fitting 90 includes a base 94 that is received around the outer surface 86 of the insulator 82, and may be crimped thereto to ensure suitable electrically conductive engagement, and a tab 96 extending from the base 94 with the tab 96 coupled to the component 92 (e.g. by a fastener received through an opening 98 in the tab 96).

Where the wire 36 is coupled to a grounded component of the assembly 10, such as the fuel pump 14, static electricity may flow from the other component 92, to ground via the insulator 82. In this way, the insulator 82 is electrically coupled to the component 92 to permit static electrical flow from component 92 so that a static electrical charge beyond a threshold does not build-up on the component 92.

FIG. 3 illustrates another implementation of electrically connecting the wire 36 to a component to inhibit or prevent build-up of a static electric charge (e.g. beyond a threshold level). In FIG. 3, the insulator 82 of either the positive or negative wire 36 that is coupled to the fuel pump 14 is engaged with a metal housing 64 of the fuel pressure regulator 32. The insulator 82 may be held against the housing 64 by a clip, fastener or by any other desired way, including having a portion of the wire trapped between the flange 20 and the housing 64 as shown in the area of the arrow 100, or between the housing and any other component. The fuel pump 14 is itself grounded and thus, the fuel pressure regulator housing 64 is likewise grounded via the insulator 82, core 80 and fuel pump 14.

In FIGS. 2 and 3, the component 92 and fuel pressure regulator 32 are grounded with regard to static electrical charges without having to strip away a portion of the insulator, and without having to engage the core 80 directly with the component 92 or regulator 32. Thus, time consuming and costly steps of removing the insulator in an area that can be engaged with a component are eliminated. Instead, the fitting 90 and housing 64 can conveniently and easily be engaged with the insulator 82, anywhere along the length of the insulator 82 to effectively dissipate or prevent the build-up of significant static electric charges. While the fitting and a direct engagement are shown in FIGS. 2 and 3, the insulator 82 may be coupled to components in other ways so long as a sufficient electrical path is provided to permit the desired static charge flow and dissipation.

In at least some implementations, a fuel system assembly includes a first fuel system component that is coupled to ground, a second fuel system component, and a wire having an insulator and a core. The insulator is electrically coupled to the second fuel system component and the core is coupled to the first fuel system component to permit static charges from the second fuel system component to flow to ground. The first fuel system component may be any portion of the fuel system that is coupled to an electrical wire, such as a fuel pump or fuel level sensor or other electrical or electronic component. In at least some implementations, the second fuel system component may be a component through which fuel flows, or a component engaged directly with (e.g. in direct contact with) a component through which fuel flows so that static electricity generated by the flowing fuel may be dissipated through the second fuel system component and wire. The second fuel system component could include a plastic component wherein the insulator is engaged with the plastic component to dissipate static electricity therefrom. The insulator may include an inner surface engaged with the core and an outer surface that defines an outer surface of the wire. The outer surface of the insulator may be electrically coupled to the second fuel system component.

The forms of the invention herein disclosed constitute presently preferred embodiments and many other forms and embodiments are possible. It is not intended herein to mention all the possible equivalent forms or ramifications of the invention. It is understood that the terms used herein are merely descriptive, rather than limiting, and that various changes may be made without departing from the spirit or scope of the invention.

The invention claimed is:

1. A portion of a fuel system, comprising:
   a first fuel system component that is coupled to ground;
   a second fuel system component; and
   a wire having an insulator and a core, wherein the insulator is electrically coupled to the second fuel system component and the core is coupled to the first fuel system component to permit static charges from the second fuel system component to flow to ground through the insulator.

2. The portion of the fuel system of claim 1 wherein electricity is provided to the first fuel system component via the core at a voltage of less than 50 volts, and wherein the insulator is insulative to voltages less than 50 volts.

3. The portion of the fuel system of claim 1 wherein the first fuel system component includes an electric motor.

4. The portion of the fuel system of claim 3 wherein the second fuel system component is arranged to permit fuel flow therethrough.

5. The portion of the fuel system of claim 4 wherein the second fuel system component includes a portion that is metal and the core is in contact with the portion that is metal.

6. The portion of the fuel system of claim 1 wherein the insulator includes an inner surface engaged with the core and an outer surface that defines an outer surface of the wire and which is electrically coupled to the second fuel system component.

7. The portion of the fuel system of claim 1 wherein the core is formed from metal and has a conductivity of at least $1 \times 10^6$ siemens/meter.

8. The portion of the fuel system claim 1 wherein the insulator includes a base material and a conductive material in the base material, wherein the conductive material has a resistivity between $10^5$ and $10^6$ ohms/square.

9. The portion of the fuel system of claim 1 wherein the insulator has an outer surface that defines an outer surface of the wire.

10. The portion of the fuel system of claim 1 wherein the core has a diameter of between 0.2 mm and 1.5 mm, and the insulator has an outer diameter of between 0.5 mm and 2.7 mm.

11. The portion of the fuel system of claim 1 wherein the maximum charge that may exist in the insulator when the insulator is coupled to ground is 0 volts to 200 volts.

12. The portion of the fuel system of claim 1 wherein the insulator has an inner surface engaged with the core.

* * * * *

UNITED STATES PATENT AND TRADEMARK OFFICE
CERTIFICATE OF CORRECTION

PATENT NO. : 10,920,722 B2  
APPLICATION NO. : 16/280327  
DATED : February 16, 2021  
INVENTOR(S) : Edward J. Talaski Page 1 of 1

It is certified that error appears in the above-identified patent and that said Letters Patent is hereby corrected as shown below:

In the Specification

Column 4, Line 29, after "lead" insert --or wire--

Column 4, Line 30, after "lead" insert --or wire--

Column 4, Line 30, after "negative" delete "leads" and insert --wires--

Column 4, Line 32, after "level" delete "sensor" and insert --sender--

Signed and Sealed this  
Eleventh Day of May, 2021

Drew Hirshfeld  
*Performing the Functions and Duties of the*  
*Under Secretary of Commerce for Intellectual Property and*  
*Director of the United States Patent and Trademark Office*